Aug. 27, 1935.    C. S. BROWN    2,012,739
CYLINDER BLOCK CONSTRUCTION FOR AIR COOLED ENGINES
Filed Nov. 10, 1933    3 Sheets-Sheet 1
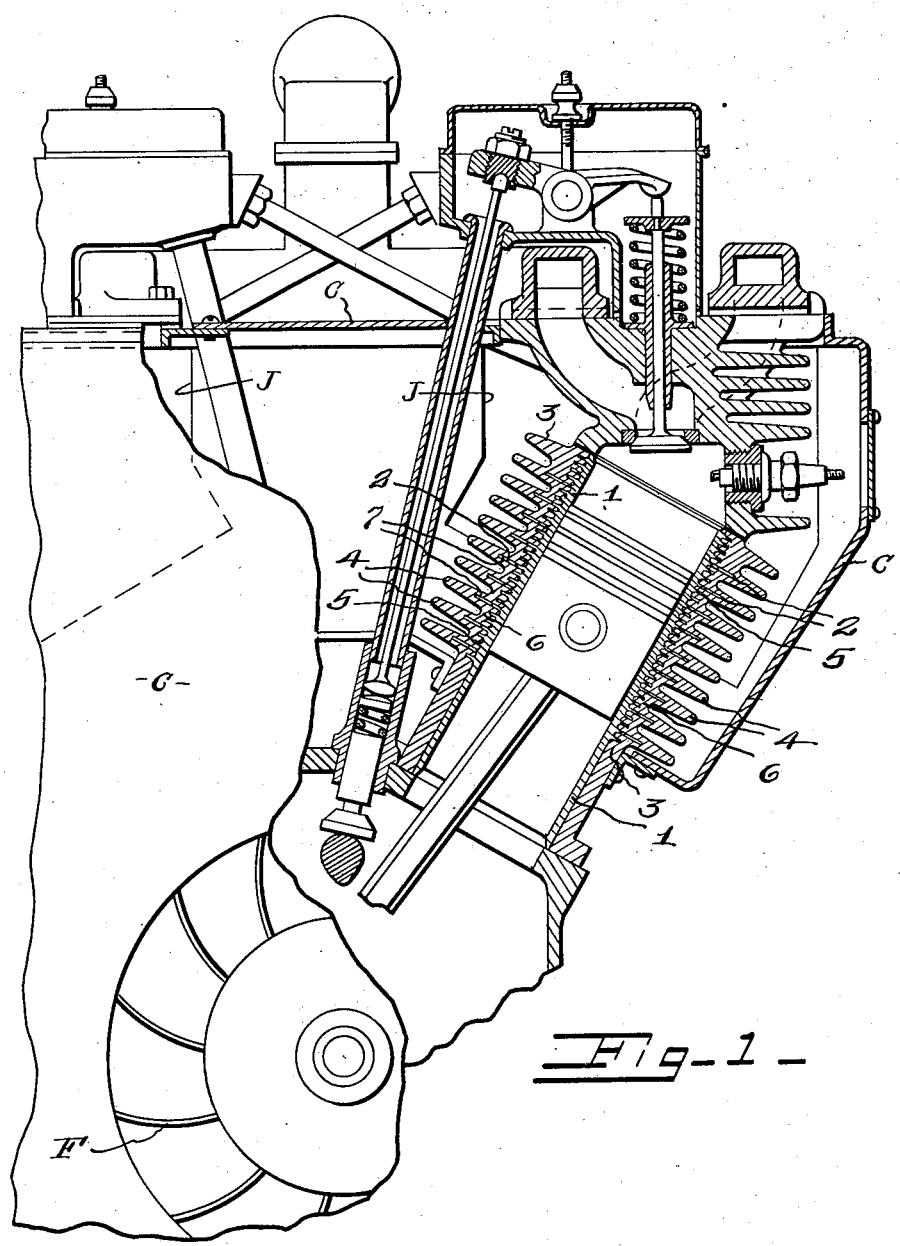
Fig-1-
INVENTOR.
Charles S. Brown.
BY
Bodell & Thompson.
ATTORNEYS.

Aug. 27, 1935.  C. S. BROWN  2,012,739
CYLINDER BLOCK CONSTRUCTION FOR AIR COOLED ENGINES
Filed Nov. 10, 1933  3 Sheets-Sheet 2
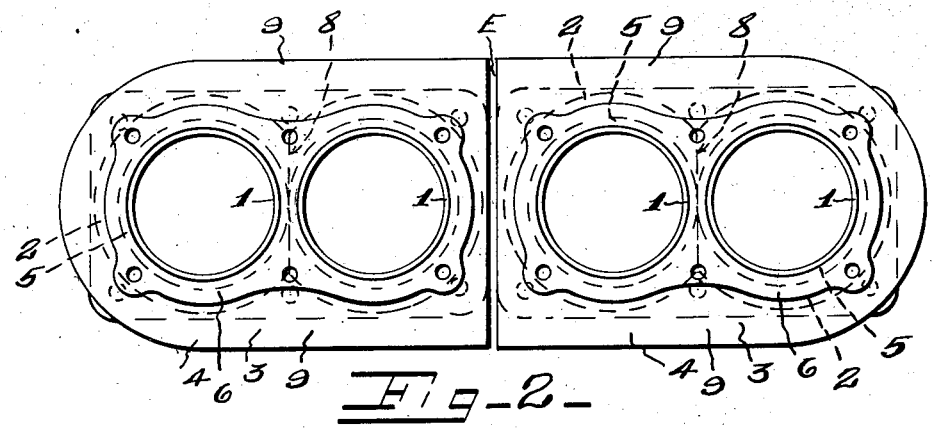
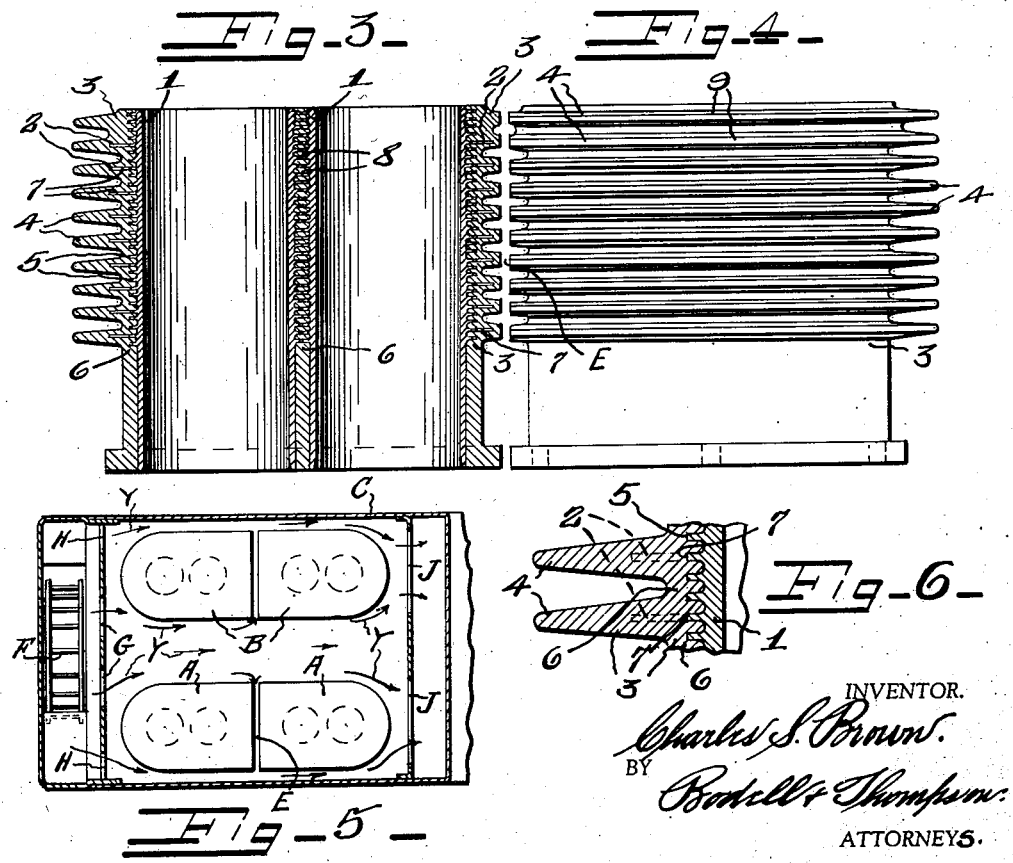
INVENTOR.
Charles S. Brown.
BY
Bodell & Thompson
ATTORNEYS.

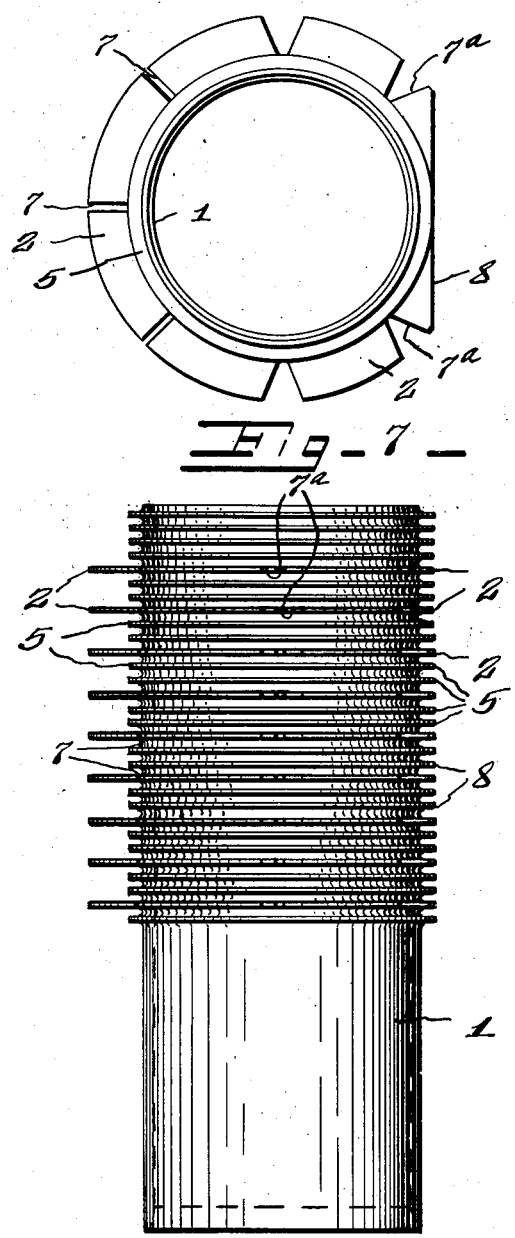

Patented Aug. 27, 1935

2,012,739

UNITED STATES PATENT OFFICE 2,012,739

CYLINDER BLOCK CONSTRUCTION FOR AIR COOLED ENGINES

Charles S. Brown, Syracuse, N. Y.

Application November 10, 1933, Serial No. 697,481

5 Claims. (Cl. 123—171)

This invention relates to air cooled internal combustion engines and has for its object a cylinder construction whereby the heat generated in the engine is rapidly conducted through heat radiating flanges outward where it can be absorbed by a cooling air current, and more particularly, a multi-cylinder block having its heat conducting flanges so located that the heat is conducted rapidly and uniformly from all portions of the cylinders of the block outward where it is quickly absorbed by the cooling air current.

It further has for its object the relative arrangement of the flanges of an inner sleeve of ferrous metal constituting the bore of the cylinder and the flanges of an outer body of a metal, as an aluminum alloy, having greater heat conductivity and lighter specific gravity, than the metal of the sleeve, so that the heat is rapidly conducted through the flanges of the sleeves and the body to where it comes in contact with the cooling air current, and further a construction and arrangement of the flanges of the sleeve whereby warping and an out-of-roundness of the sleeve is avoided.

The invention consists in the novel features and in the combinations and constructions hereinafter set forth and claimed.

In describing this invention, reference is had to the accompanying drawings, in which like characters designate corresponding parts in all the views.

Figure 1 is a fragmentary front elevation, partly in section, of a V engine embodying my invention.

Figure 2 is a bottom plan view of a pair of cylinder blocks embodying my invention.

Figure 3 is a central longitudinal sectional view through one of the blocks.

Figure 4 is a side elevation of one of the blocks.

Figure 5 is a diagrammatic plan view, parts being omitted, of an engine, as a V engine embodying two banks of cylinders and formed of blocks embodying my invention.

Figure 6 is an enlarged fragmentary sectional view through one of the cylinders illustrating the relative arrangement of the flanges of the sleeves to the flanges of the outer aluminum alloy body.

Figure 7 is a plan view of one of the sleeves.

Figure 8 is an elevation of one of the sleeves.

Multi-cylinder air cooled engines are, insofar as I am aware, formed with the individual cylinders as distinguished from being formed in a block, in order that the heat from the individual cylinders may be radiated and absorbed equally throughout the circumference of the individual cylinder, or in order that the cooling air current may be passed between adjacent cylinders. In some forms of air cooled engines, the air is blown transversely from one side of the bank of cylinders to the other and provision made to direct the current so that the lee sides of the cylinders cool as efficiently as the windward sides. However, with individual cylinders, a considerably longer crank shaft is necessary than in a water cooled engine of the same cylinder bore and the same number of cylinders, as in water cooled engines, a great amount of space is conserved by casting the cylinders en-bloc. The en-bloc construction of water cooled engines reduces greatly the cost of manufacture over engines with individual cylinders. The increased cost of air cooled engines over water cooled engines is largely due to the fact that the air cooled engines have individual cylinders, and it has been thought, can not be made with cylinders en-bloc because of the difficulty in cooling the cylinders uniformly throughout their circumferences. Ununiform cooling results in out-of-roundness of the bores of the cylinders. One of the principal objects of the invention is a multi-cylinder block for air cooled engines wherein the heat is conducted quickly and uniformly from the cylinder bores so that an out-of-roundness does not result.

I have here illustrated the multi-cylinder engine block as consisting of a pair of cylinders, and in Figure 2, two blocks are shown and the relative arrangement they would occupy in a four cylinder engine. In six or eight cylinder straight engines, there would be an additional block or blocks with forms of rectangular outward shape in plan view between the two blocks shown. In a V eight engine, as shown in Figure 1, the blocks of the two banks are, as shown in Figures 2 and 5. The number of cylinders in any one block is dependent upon the crank shaft bearings required, as will be understood by those skilled in the art. In an engine of the cylinder arrangement here shown, there are crank shaft bearings at the ends of the crank shaft, and between the cylinder blocks.

This cylinder block is in some aspects of the invention equally applicable to a single cylinder as to a block containing a plurality of cylinders. In its broader aspects as applied to a single cylinder, the construction comprises a sleeve 1 of a ferrous metal constituting the bore of the cylinder, the sleeve having integral circumferentially extending comparatively wide heat radiating flanges 2, and a body 3 of a metal, as aluminum alloy, of a greater heat conductivity and of less specific gravity than the metal of the sleeve 1, the body being provided with integral circumferentially extending heat conducting flanges 4 into which the flanges 2 extend part way or in which the flanges 2 are embedded. Also, preferably, the sleeve 1 is provided with one or more circumferentially-extending, narrow heat conducting flanges 5 between the flanges 2, these being embedded only in the portion 6 between the ribs of the body 3. If it is desirable for cooling the cylinder farther toward the crank case, narrow flanges might also be provided around the lower ends of the cylinders into the base portion of the body 3 where it approaches the crank case. Owing to this construction heat is conducted by the wider flanges 2 quickly into the flanges 4 and also heat is conducted quickly from the sleeve 1 into the portion 6 of the body and thence into the flanges 4 of the body, where it can be absorbed quickly by the cooling air current. Also, in order to avoid out-of-roundness due to the difference in the coefficient of expansion of the metal of the flanges 2 and 4, and due to the greater variation in expansion between the wide flanges 2 of the sleeve 1 and the aluminum alloy in which they are embedded because of the greater distance the flanges 2 extend into the flanges 4, the flanges 2 are provided at intervals with slits 7 extending inward from their outer edges but terminating near or in the circle of the outer edges of the narrow flanges 5. The slits 7 have for the most part parallel sides, but in order to avoid the development of out-of-roundness, the segments of the flanges toward the intermediate part of the block are formed with the slits V shaped at 7ᵃ or with the end edges of the segments parallel. The flanges 2 and 5 are formed on the sleeve in any suitable manner, as by machining or otherwise, and then the sleeves are set in the mould and the aluminum alloy body cast around it. By taking proper care in the casting operation, the aluminum alloy firmly unites with the sleeve and its flanges 2 and 5. The slits 7 are wide enough to permit the aluminum to flow between the segments of the flanges 2 formed by the slits 7. The adhesion might be improved by plating the steel cylinder with certain alloys before placing in the mould.

In the multi-cylinder block, the sleeves 1 are arranged side by side and spaced apart slightly and the wider flanges 2 are cut off at a tangent at 8 on the sides of the sleeves which are adjacent or closest together, the adjacent sleeves being so arranged that the edges of the narrower flanges 5 are substantially tangent where the sleeves are closest together, as seen in Figures 2 and 3.

In the multi-cylinder block, the portions 9 of the flanges 4 of the body on the lateral sides of the block are continuous or straight, constituting webs between the opposing semi-cylindrical halves of two adjacent sleeves of the block, so that the heat is conducted from the opposing sides of two sleeves by these wide webs quickly to points where the heat is absorbed from the flanges by the cooling air current. This avoids the cylinders becoming out-of-round, as they become heated, and permits the cylinders of the block to be located close together and at the same time effects a uniform cooling without spacing the adjacent cylinders apart to provide air passages. It is intended whether the engine is an in-line or a V-engine, or an engine with two banks of cylinders, that the cooling air current passes lengthwise of the line or banks of cylinders with cross-over passages between the blocks and in front of the front block and in the rear of the rear block, and in Figure 5, the direction of the air current is shown by the arrows Y.

In Figure 5, C designates a casing surrounding two banks of cylinders A, B. F designates a fan actuated by the engine and usually mounted on the crank shaft of the engine with suitable conduits for directing the air through outlets G into the space between the banks of cylinders and through outlets H into the space between the outer sides of the banks and the casing C. The air thus passes lengthwise of the banks of cylinders on both sides thereof and can cross over from the passage between the banks to the passages on the outer sides of the banks through the space or passage E between the blocks. The air also strikes or passes across the front end of the front block and the rear end of the rear block. The air passes out of the casing through discharge openings J. This arrangement of the housing with its inlets and outlets and of the valves, and the fan, valve mechanisms, etc., forms no part of my invention but forms the subject matter of my application Serial No. 634,415 filed September 22, 1932.

In any form of my invention, the cooling air current takes the path analogous to that shown in Figures 1 and 5.

Owing to the relative arrangement of the flanges of the ferrous alloy sleeve and the aluminum alloy body, the heat generated by the engine is quickly conducted into the flanges of the body where it is absorbed by the cooling air current. Also, owing to this construction, in a multi-cylinder block, the heat generated in the cylinders is uniformly conducted outward into the flanges, where it is absorbed by the cooling air current, particularly from the cylinder walls of two adjacent cylinders, which are opposed to each other, and without providing a passage between the cylinders of any one block, so that the length of the block in air cooled engines can be shortened in a manner comparable to the shortening in water cooled engines.

By my cylinder construction, an air cooled engine can be manufactured at a cost comparable with that of the water cooled engine of the same cylinder bore and number of cylinders, and will have no greater over-all length than a water cooled engine of the same cylinder bore and number of cylinders.

What I claim is:

1. A cylinder for internal combustion engines having an inner sleeve forming the bore of the cylinder, the sleeve having comparatively wide circumferentially extending flanges and narrow flanges between the wide flanges, and a body of metal of greater heat conductivity than that of the sleeve, in which the flanges of the sleeve are embedded, the body having a base portion around the sleeve and circumferentially extending flanges, the wide flanges of the sleeve extending into the flanges of the body and the narrow flanges of the sleeve extending into the base portion of the body.

2. A cylinder for air cooled engines comprising a sleeve having circumferentially extending flanges and an outer body of a metal of greater heat conductivity than the metal of the sleeve, said body having circumferentially extending flanges and the flanges of the sleeve extending into the flanges of the body, the flanges of the sleeve being provided with radially extending slits spaced apart at intervals around the sleeve.

3. A cylinder block for multi-cylinder air cooled engines comprising a plurality of sleeves spaced apart and constituting the bores of the cylinders and a body of a metal of greater heat conductivity than the metal of the sleeves surrounding the sleeves and in which the sleeves are embedded, the sleeves having peripheral circumferentially extending, comparatively wide flanges and peripheral circumferentially extending narrow flanges between the wide flanges, the body including a base portion in which the sleeves with the shorter flanges are embedded and peripheral circumferentially extending flanges in which the wider flanges of the sleeves extend, the flanges of the body being continuous on the lateral sides of the block between the opposing halves of the sleeves and the narrow flanges of the two adjacent sleeves being substantially tangent to each other where the sleeves are nearest together.

4. A cylinder block for air cooled internal combustion engines comprising a plurality of sleeves forming the bores of the cylinders and a body of metal of greater heat conductivity than the metal of the sleeves in which the sleeves are embedded, the body having circumferentially extending flanges and the flanges on the lateral sides of the block being continuous whereby they extend in a tangential direction across the space between opposing halves of two adjacent sleeves, each of the sleeves having circumferentially extending flanges extending into the flanges of the body, the flanges of the sleeves being split radially at intervals around the sleeves.

5. A cylinder block for multi-cylinder air cooled engines comprising a plurality of sleeves spaced apart and constituting the bores of the cylinders and a body of a metal of greater heat conductivity than the metal of the sleeves, surrounding the sleeves and in which the sleeves are embedded, the sleeves having peripheral circumferentially extending wide flanges and peripheral circumferentially extending narrow flanges between the former flanges, the body including a base portion in which the cylinders with the shorter flanges are embedded and peripheral circumferentially extending flanges in which the wide flanges of the sleeves extend, the flanges of the body being continuous on the lateral sides of the block between the opposing halves of the sleeves, and the narrow flanges of the two adjacent sleeves being substantially tangent to each other where the sleeves are nearest together, the wider flanges of the sleeves being split radially at intervals around the sleeves.

CHARLES S. BROWN.